US011448296B2

(12) United States Patent
Mata Rey

(10) Patent No.: US 11,448,296 B2
(45) Date of Patent: Sep. 20, 2022

(54) CENTRIFUGAL IMPACT TRANSMISSION

(71) Applicants: Joachim Bazant, Deutsch Kaltenbrunn (AU); David Mata Rey, Barcelona (ES)

(72) Inventor: David Mata Rey, Barcelona (ES)

(73) Assignees: David Mata Ray, Barcelona (ES); Joachim Bazant, Deutsch Kaltenbrunn (AT)

(*) Notice: Subject to any disclaimer, the term of this patent is extended or adjusted under 35 U.S.C. 154(b) by 39 days.

(21) Appl. No.: 16/640,476

(22) PCT Filed: Nov. 30, 2017

(86) PCT No.: PCT/ES2017/070790
§ 371 (c)(1),
(2) Date: Feb. 20, 2020

(87) PCT Pub. No.: WO2019/038458
PCT Pub. Date: Feb. 28, 2019

(65) Prior Publication Data
US 2020/0217402 A1    Jul. 9, 2020

(30) Foreign Application Priority Data

Aug. 21, 2017  (WO) .................. PCT/ES2017/070583

(51) Int. Cl.
*F16H 33/02*     (2006.01)
*F16H 29/12*     (2006.01)

(52) U.S. Cl.
CPC ............. *F16H 33/02* (2013.01); *F16H 29/12* (2013.01)

(58) Field of Classification Search
CPC .......... F16H 29/02; F16H 29/12; F16H 31/00; F16H 31/003; F16H 33/02; F16H 33/08; F16H 21/12
(Continued)

(56) References Cited

U.S. PATENT DOCUMENTS 1,163,789 A * 12/1915 Stevens .................. F16H 29/02
                                                              74/118
2,211,464 A *  8/1940 Hutchison, Jr. ......... F16H 33/08
                                                               74/64
(Continued)

FOREIGN PATENT DOCUMENTS

DE    102017109611 A1 * 11/2017 ............. F16K 31/46
FR         601943           3/1926
(Continued)

*Primary Examiner* — Joseph Brown
(74) *Attorney, Agent, or Firm* — Defillo & Associates, Inc; Evelyn A. Defillo

(57) ABSTRACT

A centrifugal impact transmission between a drive shaft (1) with one or more rotors (1) and one or more driven shafts (6) parallel to the drive shaft (1): each rotor (1) or rotor level (1) includes one or more arms (2) joined to the rotor (1) by a joint (4) and with a mass (3) at the free end thereof, which can be disconnected via a clutch. Each driven shaft (6) includes at least one lever (7), joined to the driven shaft (6) via a one-way clutch, and aligned with a rotor (1), the lever (7) having a return mechanism (8). In this way, each arm (2) has at least one lever (7) aligned with it, and the rotation of each rotor (1) produces the consecutive impact of the arms (2) thereof on each lever (7) aligned with the rotor (1).

7 Claims, 3 Drawing Sheets

(58) Field of Classification Search
USPC .................. 74/64, 84 R, 116, 118, 125.5
See application file for complete search history.

(56) References Cited

U.S. PATENT DOCUMENTS

| | | | | |
|---|---|---|---|---|
| 2,225,698 | A | | 12/1940 | Hutchison |
| 3,552,220 | A | * | 1/1971 | MacDermod ........... F16H 25/02 74/107 |
| RE28,122 | E | * | 8/1974 | Dahlstrom ............. F16H 29/04 74/125.5 |
| 3,930,416 | A | * | 1/1976 | Dahlstrom ............. F16H 29/02 74/125.5 |
| 3,951,005 | A | * | 4/1976 | Dahlstrom ............ F16D 41/066 74/125.5 |
| 4,003,457 | A | * | 1/1977 | Dahlstrom ............ F16D 41/066 192/45.003 |
| 4,091,684 | A | * | 5/1978 | Lehmann ................ F16H 29/02 74/112 |

FOREIGN PATENT DOCUMENTS

| | | | | |
|---|---|---|---|---|
| FR | 1128620 | | 1/1957 | |
| FR | 2767174 | A1 * | 2/1999 | ............. B62M 1/28 |
| GB | 240259 | | 10/1925 | |
| GB | 1456892 | A * | 12/1976 | ............. F16H 29/02 |
| JP | 2015100231 | A * | 5/2015 | |
| JP | 2006525915 | A * | 11/2016 | |
| WO | WO-2005001310 | A1 * | 1/2005 | ............. F16H 33/02 |
| WO | WO2009058040 | | 5/2009 | |
| WO | WO-2016088674 | A1 * | 6/2016 | ............. F16H 33/02 |

* cited by examiner

CENTRIFUGAL IMPACT TRANSMISSION

CROSS REFERENCE TO RELATED APPLICATION

This application is a national stage entry of PCT/ES2017/070790 filed Nov. 30, 2017, under the International Convention claiming priority over PCT Patent Application No. PCT/ES2017/070583 filed Aug. 21, 2017.

FIELD OF THE ART

The present invention refers to a centrifugal transmission system located between two parallel rotary shafts, operating by means of the impact of the elements of both shafts. It is of use in the industries of mechanics and the transmission of mechanical power.

STATE OF THE ART

The transmission of power by means of cogs is known in the state of the art, wherein a drive shaft is capable of acting upon a second shaft by means of two or more cogwheels. An example of this type can be found in GB240259.

This type of transmission is used very often since it makes it possible to transmit power with variable ratios (in gearboxes), with changes of orientation (in bevel gears), or even converting a rotatory movement into a linear movement (using a rack).

Other known types of transmission, though considered less recent background of the invention, include the use of belts, chains, or other flexible elements.

The applicant does not know of any transmission mechanisms similar to the invention.

SUMMARY OF THE INVENTION

The invention consists of a centrifugal impact transmission according to the claims.

More specifically, this type of transmission comprises a drive shaft with one or more rotors transmitting the power thereof to one or more driven shafts. In order to do so, each rotor comprises one or more arms joined to the rotor by means of a joint. A mass is arranged on the free end of each arm, which can rotate freely on a shaft parallel to the drive shaft or to a low friction material with enough resistance.

In addition, the driven shafts comprise levers aligned with the rotors, so that each driven shaft comprises at least one lever aligned with a rotor, and each arm has at least one lever aligned with it in the rotation thereof. The levers are joined to the driven shaft thereof by means of a one-way clutch in order to transmit movement only in one direction. The levers comprise respective return mechanisms, for example, springs.

In this way, the rotation of each rotor produces the consecutive impact of the arms thereof on each lever aligned with the rotor.

It should be taken into consideration in the description that when rotors are mentioned, they could have the arms thereof on a single level or on several levels. So that it is equivalent to speak of two rotors, each with arms on one level, and to speak of a rotor with arms on two levels. In order to avoid confusions, the entire description will refer to "rotors" for each level with arms, but in reality, they may correspond to a single rotatory body with several levels, or to independent bodies.

The only difference between both alternatives is the possibility of disconnecting independent rotors by means of optional disconnection clutches, while it is not possible to disconnect individual levels of a single rotating body. The optional disconnection clutches make it possible to vary the output ratio or to connect the different driven shafts as needed. For example, if a driven shaft is only connected with a rotor, disconnecting said rotor makes it possible to isolate said driven shaft.

In a first use, the drive shaft will include two or more rotors, or a rotor with two or more levels, with an equal number of arms distributed homogeneously. This means that the offset between two consecutive impacts is constant.

If desired, a step-by-step transmission will comprise a single rotor with a single arm for each driven shaft.

In order to facilitate the orientation of the impact, it is preferable for the arms to be curved, ensuring that the two surfaces are as perpendicular as possible in the moment of impact, and also that they are in the most radial position possible.

When springs are used, in order to give time for the lever to return without having to use overly powerful springs, it is preferable that the levers retreat at angles between 10° and 30°.

DESCRIPTION OF THE DRAWINGS

In order to ensure a better understanding of the invention, the following drawings are included.

EMBODIMENTS OF THE INVENTION

Figure 1:
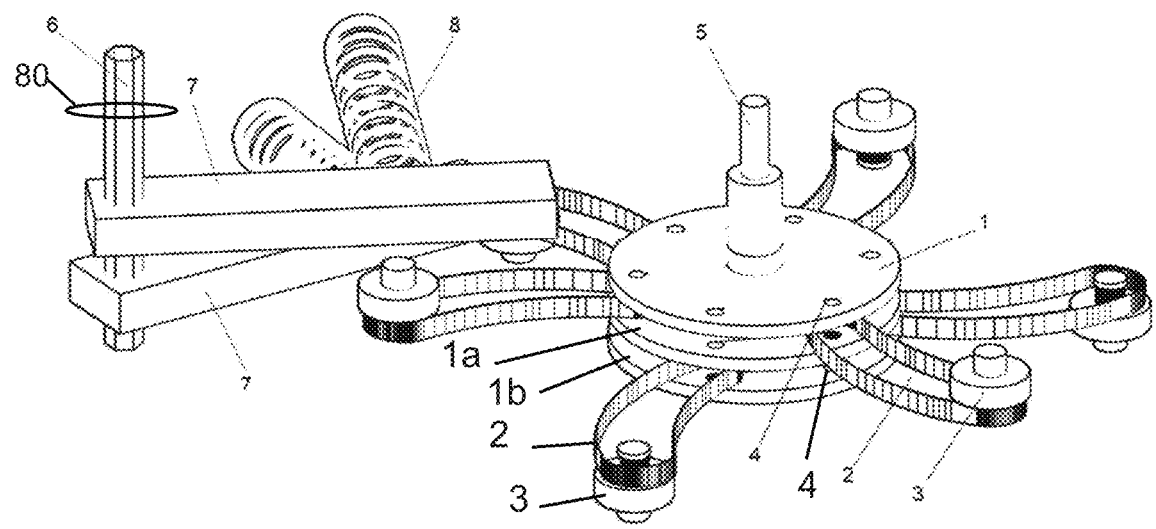
FIG. 1: Perspective view of an example embodiment of the invention.

Hereinafter, a brief description of an embodiment of the invention is provided, for purely illustrative purposes and without limitation.

The embodiment shown in the drawings comprises a drive shaft (5) having at least one rotor (1a, 1b) each rotor having with a plurality of arms (2) finished with a mass (3). The arms (2) are joined to the center of the rotor (1) by means of respective joints (4), which can rotate freely thereon. If desirable, the stroke of the arms (2) can be limited within a desired range by means of the corresponding stops (not shown in the drawings). Both rotors (1a, 1b) represented are located on the same drive shaft (5) and are connected to it. However, both rotors (1a, 1b) may comprise clutches that activate or deactivate the rotation of each rotor (1a, 1b) independently.

The transmission in the drawings also comprises a driven shaft (6) that is parallel to the drive shaft (5), with a series of levers (7). The levers (7) are connected to the driven shaft (6) by means of a one-way clutch (not visible). That is, the rotation of the lever (7) is transmitted to the driven shaft (6) in only one direction. By contrast, the lever (7) rotates independently from the driven shaft (6) in the opposite direction. An example of this type of clutches, which are known in the art, is a ratchet mechanism or a unidirectional bearing.

Figure 2:
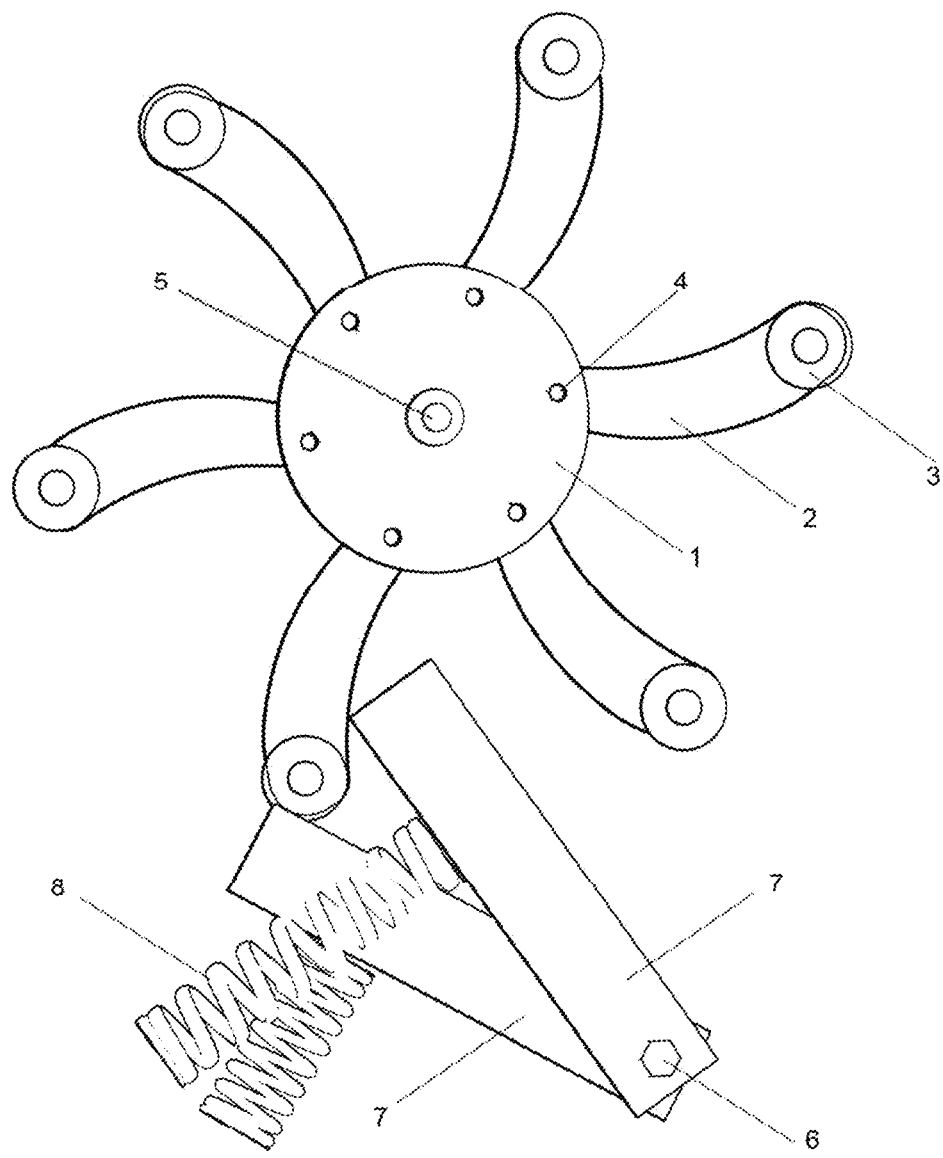
FIG. 2: Upper view of the example embodiment of FIG. 1.

Each lever (7) comprises a return mechanism (8) that has been represented in FIGS. 1 and 2 as a coiled spring. However, they could also be torsion springs, sheet springs, or any other spring known in the art. The type of spring and the position where the other end thereof is fixed to can be relevant. For example, a torsion spring fixed to the driven shaft (6) is preferable over the spring represented.

Figure 3:
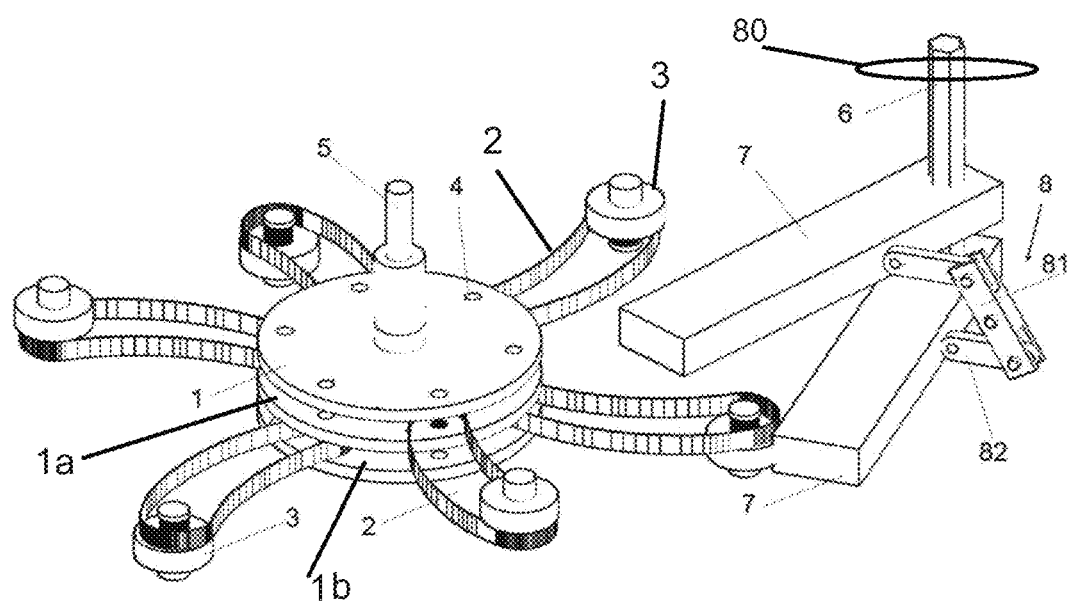
FIG. 3: Perspective view of a second example embodiment.

Additionally, FIG. 3 shows a new form of a return mechanism that can be used when the number of levers (7) on a driven shaft (7) is higher than two, since it requires coupling two levers (7) in pairs. Any odd lever (7) would have to use some type of spring.

The return mechanism (8) of FIG. 3 comprises a rocker (81) joined by respective bushings (82) to the levers (7). The rocker (81) is articulated in the center thereof, so that the impact over one lever (7) transmits the movement to the rocker (81), which pushes forward the other lever (7) of the pair. This implies that the two levers cannot be impacted at the same time, requiring instead a certain minimum offset.

The rotation of each rotor (1a, 1b) causes the centrifugal force to separate the masses (3) of the drive shaft (5) by rotating the arm (2) thereof on the joint (4). In one point of the journey thereof, the mass (3) hits the lever (7), which absorbs the energy by moving backwards, causing the driven shaft (6) to rotate. The movement of the lever (7) can be regulated, but preferably it should not be too excessive in order to give it enough time to return. 20° is a recommended value. The return of the lever (7) to the rest position thereof is not transmitted to the driven shaft (6) by the one-way clutch.

Once the lever (7) returns to the rest position thereof, it can be hit by the following arm (2), while the previous arm (2) deploys by means of the centrifugal force.

FIG. 2 shows the position of the two levers (7) on FIG. 1, one of them in the rest position and the other in the position after being impacted.

The invention can be applied also to several driven shafts (6) and levers (7), in any combination thereof:

A driven shaft (6) with as many levers (7) as rotors (1), with the shaft aligned with said rotors.

Two or more driven shafts (6), each of them with as many levers (7) as rotors (1), with the shafts aligned with said rotors.

Two or more driven shafts (6), each with a lever (7) aligned with a different rotor (1).

Several driven shafts (6), each with a number of levers (7) aligned with all the rotors (1) or with some of them.

Each of these combinations of driven shafts (6) and levers (7) provides different outputs on each driven shaft (6). For example, with a single lever (7) per driven shaft (6) aligned with a single-arm (2) rotor (1), the result is a single movement of the driven shaft (6) for each revolution of the rotor (1), so the output can be considered as "step by step".

It can also be a continuous output if there is a sufficient number of levers (7) and arms (2) for the sum of returns to equal 360°. For example, if the transmission comprises six arms (2) on each rotor (1) or level, and three rotors (1) or three levels of arms (2) are arranged, the driven shaft (6) receives 18 impacts per revolution. If the lever (7) goes back 20°, this equates to a revolution of the driven shaft (6) for each revolution of the drive shaft (5). A higher number of rotors (1) and levers (7) makes it possible to increase the output speed.

Another way of modifying the output of the driven shaft (6) is to modify the length of the arms (2) or levers (7), the weight of the mass (3) and the return movement of the lever (7). In any case, it is recommended that the number of arms (2) per rotor does not exceed six arms, in order to give time for the lever (7) to return.

If the number or arrangement of the arms (2) is not balanced, it may also be necessary to include a counterweight (not shown) in order to center the axis of inertia on the drive shaft (5).

The mass (3) may include a bearing so that the impact on the lever (7) has no friction. Equally, it could be made of a low friction material, but with high resistance to impact and abrasion. The shape of the arm (2), which is curved in the figures, may also vary in order to control the angle of impact. Equally, it may be advantageous to include a guide (not shown) directing the deployment of the arms (2) after impact. This guide may, for example, keep the arm (2) folded until a moment before impact, for example, at 90° rotation of the rotor (1), achieving maximum centrifugal force by means of the accumulated potential energy thereof.

In the represented figures, the arms (2) of the different rotors (1a, 1b) are offset, with the impacts perfectly distributed. However, the offset between the different arms (2) may be modified:

If all the arms (2) impact on the levers (7) of the same driven shaft (6) at once, the rotation will be reduced but the pair will be elevated.

If the impacts are distributed homogeneously, that is, if they are distributed so that the time between two consecutive impacts is the same, the drive shaft (5) is slowed down less.

In any case, it is recommended to place flywheels 80 in any driven shaft (6) requiring one in order to stabilize the output and store kinetic energy.

The power source of the drive shaft (5) and how every driven shaft (6) is used is not considered relevant for the invention, since the invention is particularly versatile.

The shafts (5, 6) are generally arranged vertically, but other arrangements are possible. For example, if they are arranged horizontally, it is preferred that the impact on the levers (7) is made during the descending movement of the arm (2).

The invention claimed is:

1. A centrifugal impact transmission comprising:
   a drive shaft (5) having a plurality of rotors (1);
   a driven shaft (6) parallel to the drive shaft (5);
   wherein each one of the rotors (1) comprises a plurality of arms (2), each one of the arms has a first end joined to the corresponding rotor (1) by a joint (4), which rotates on the rotor;
   a mass located on a second end of each one of the arms, the masses on adjacent rotors are facing opposite directions;
   wherein the driven shaft (6) comprises a plurality of levers (7) connected to the driven shaft (6) by using a one-way clutch,
   wherein each one of the levers (7) corresponds to one of the rotors and is coplanar with the corresponding rotor (1),
   a return mechanism (8);
   wherein rotation of each one of the rotors (1) produces centrifugal forces that rotate each one of the arms producing the masses to impact the corresponding lever (7); and
   wherein the return mechanism (8) is a rocker (81) joined to two adjacent levers (7) so the impact of each mass on the corresponding lever (7) pushes forward the adjacent lever (7).

2. The transmission according to claim 1, wherein each one of the rotors (1) comprise a clutch.

3. The transmission according to claim 1, wherein each one of the masses (3) rotates freely on a shaft parallel to the drive shaft (5).

4. The transmission according to claim 1, wherein each one of the arms has a curved shape.

5. The transmission according to claim 1, wherein the levers (7) have a return movement between 10° and 30°.

6. The transmission according to claim 1, wherein the arms (2) of the rotors (1) are distributed on two or more levels.

7. The transmission according to claim 1, further comprising a flywheel on the driven shaft (6).

* * * * *